Figure 1:
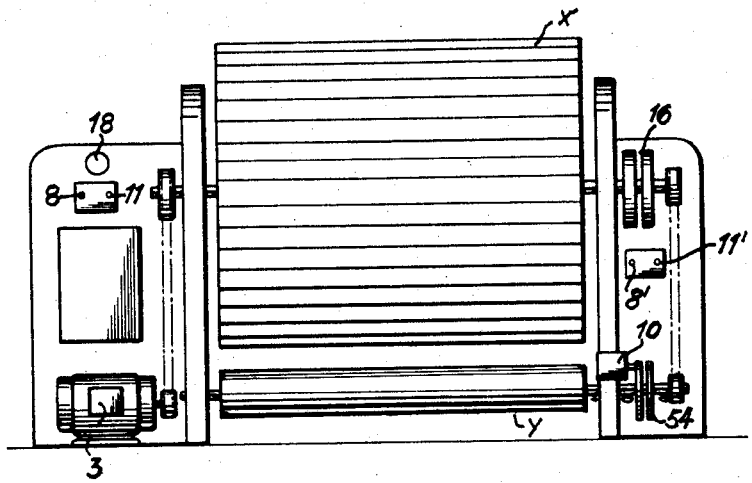

April 22, 1958   H. FISCHERMANN   2,832,027

ELECTRICAL CONTROL APPARATUS

Filed Aug. 4, 1954

Inventor

Heinz Fischermann

United States Patent Office 2,832,027
Patented Apr. 22, 1958

2,832,027

ELECTRICAL CONTROL APPARATUS

Heinz Fischermann, Neersen, near Dusseldorf, Germany, assignor to Franz Muller, Maschinenfabrik, M. Gladbach, Germany Application August 4, 1954, Serial No. 447,863

2 Claims. (Cl. 318—421)

The present invention relates to a control apparatus for rotatable members.

More particularly the present invention relates to an apparatus and control circuit for controlling the rotation of rotating members in a material roughening machine.

In the processing of different types of materials, in order to establish the proper nap on the fabric, the material is passed through a material roughening machine. In one type of such a machine a large diameter roughening drum is used, mating with a smaller diameter smooth rolling member. In the operation of such machine the large diameter drum presents a large starting torque to the driving motor. Similarly, once the drum has been brought up to its full operating speed it has a high moment of inertia and is difficult to bring to a complete stop within a short time interval.

Another problem in a material roughening machine occurs when the material being processed through the machine suddenly tears and removes the load from the rotating members. The reverse operating problem is presented when the material jams and prevents rotation of the rolling members. While these problems have been outlined particularly with respect to a material roughening machine it is clear that similar operating difficulties are presented to circuits serving to control the rotation of any rotatable members. The apparatus and control circuit embodying the principles of the present invention overcomes all these operating problems in a compact and inexpensive manner. Accordingly, it is an object of the present invention to provide a new and improved apparatus and circuit for controlling the rotation of rotatable members.

Another object of the present invention is to provide a control circuit for overcoming high starting torque presented by a rotatable member.

A further object of the present invention is to provide a new and improved circuit which can overcome a high moment of inertia presented by a rotating member in order to bring this member to a complete stop.

A still further object of the present invention is to provide a circuit which safeguards a motor driving the rotatable member.

Yet another object of the present invention is to provide a control circuit for material roughening machines.

More particularly the present invention includes a polyphase alternating current motor rotatably connected to a rotatable member, a polyphase alternating current power supply for energizing the motor, a series resistor connected in one phase of the alternating current motor, a starting switch for connecting the power supply to the motor whereby upon activation of the starting switch the motor smoothly starts rotating with the resistor in series with one phase thereof, and means for short circuiting the series resistor after the motor has started to rotate.

In another embodiment of the present invention the apparatus includes a polyphase alternating current motor rotatably connected to a rotatable shaft, a polyphase alternating current power supply for energizing the motor, first switching means for connecting the motor to the power supply, a magnetic brake mounted on said rotatable shaft, means for energizing the magnetic brake, and second switching means for disconnecting the motor from the power supply and simultaneously initiating energization of the magnetic braking means whereby the motor is deenergized and the rotatable member is simultaneously decelerated by the magnetic brake.

Another embodiment of the present invention includes a polyphase alternating current motor rotatably connected to a rotatable member, a polyphase alternating current power supply for energizing the motor, a series resistor connected in one phase of the alternating current motor, a starting switch for connecting the power supply to the motor whereby upon activation of the starting switch the motor smoothly starts rotating with the resistor in series with one phase thereof, means for short circuiting the series resistor after the motor has started to rotate, and a clutch member connected to the rotatable member for disconnecting the motor from the rotatable member when the rotatable member is subjected to an undesirable load condition.

Figure 2:
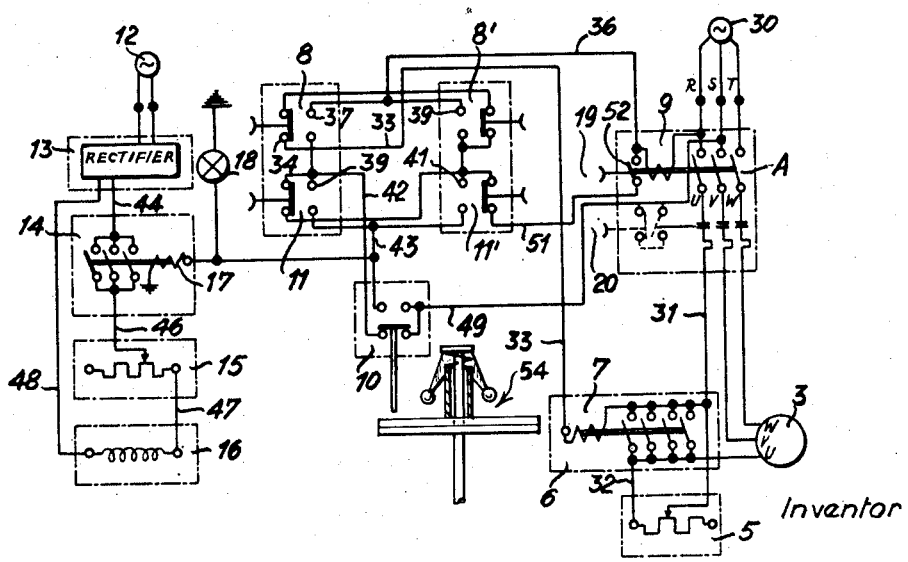

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view of a material roughening machine showing the relative positions of the various elements making up the control apparatus; and Fig. 2 is an electrical schematic diagram showing the inter-relationship of the various cooperating elements of one embodiment of the control apparatus and circuit incorporating the principles of the present invention.

Referring to Fig. 1 a material roughening machine is shown together with the associated control apparatus embodying the principles of the present invention. The large diameter roughening drum X is shown mounted above the smooth smaller diameter roller Y. Attached to the shaft on which drum X is mounted is the driving polyphase alternating current motor 3. At the right end of the shaft supporting drum X are shown magnetic brake members 16.

Attached to the right end of the shaft supporting roller Y is a clutch member 54 connected to a limit switch 10. It can be seen in this figure that roller Y is rotatably connected to the drum X at the extreme right end of their rotating shafts.

Also shown in Fig. 1 are starting and stopping switches 8 and 11 respectively at the left hand side of the machine and starting and stopping switches 8 and 11' respectively at the right hand side of the machine. Above switches 8 and 11 is mounted an indicating light 18.

Referring now to Fig. 2, it can be seen that power for energizing the three-phase alternating current motor 3 is derived from a three-phase power supply 30 and indicated by the letters R, S and T. The three-phase supply is connected to the contacts of a multi-pole protective switch indicated generally by the dotted outline 4. The mating contacts of switch 4 are directly connected to phases V and W of the three phases U, V and W of the motor 3. However the phase U is connected on conductor 31 to a normally open contact of a relay 6. Conductor 31 is also connected to the variable tap of an adjustable resistor 5.

One end of the resistor 5 is connected on conductor 32 to the mating contact of relay 6 and then to phase U of motor 3. Relay 6 has an energizing winding 7 having one end connected to conductor 31 and its other end connected on conductor 33 to the normally closed contact 34 of push button switch 8.

The switch 4 has an energizing winding 9 having one end connected to the phase R of the power supply and its other end connected on conductor 36 to the normally open terminals 37 and 38 of parallel connected push button switches 8 and 8' respectively. The other normally open contacts of switches 8 and 8' are connected respectively to terminals 39 and 41 of parallel connected switches 11 and 11'. Terminal 39 of switch 11 and one normally closed contact thereof are connected on conductor 42 to normally closed contact of push button limit switch 10. The other normally open contact of switch 11 is connected on conductor 43 to a normally open contact of switch 10.

Conductor 43 is also connected to the energizing winding 17 of a multi-pole relay 14. This side of the winding 17 is also connected to a lamp 18, which in turn is connected to ground. One group of the normally open contacts of the relay 14 are connected together and to a rectifier 13 by means of conductor 44. The mating contacts of relay 14 are connected together and on conductor 46 to the adjustable tap of a variable resistor 15. The other end of resistor 15 is connected on conductor 47 to one side of an energizing winding for the magnetic brake 16. The other side of the energizing winding is connected on conductor 48 to the output of the rectifier 13. The input to rectifier 13 is connected to a single phase alternating current supply 12.

The limit switch 10 is also connected by means of conductor 49 to phase S of power supply 30. The switch 11' also has one of its normally closed contacts connected on conductor 51 to the movable armature 52 of switch 4.

In operation, switches 8 and 8' are starting switches which can be used independently by the operator depending on which side of the machine he happens to be. Similarly, switches 11 and 11' are stopping switches, also independently operable from either side of the rotating member. When either switch 8 or 8' is pressed in, its normally opened contacts are shorted thereby connecting winding 9 of switch 4 between phases R and S of the power supply 30. This energizes the winding 9, attracting armature 52 and closing the contacts of switch 4. This supplies power to the motor 3 which starts rotating. It should be noted that at this point the adjustable resistor 5 is connected in series with phase U of the motor. Therefore the motor starts slowly and smoothly even though presented with the large starting torque of the drum X.

When the speed of the motor has reached the desired value, the switch 8 or 8' is released. This deactivation of the starting switch connects the energizing winding 7 of relay 6 between phases R and S of the three-phase power supply through the closed switch 4. It should be noted that switch 4 remains closed even after the release of the starting switch because its energizing winding 9 is still connected through its closed armature 52 and the normally closed switches 11 and 10 to the phase S. This switch 4 therefore will remain closed until the operation of switches 11, 11' or 10.

The energization of the winding 7 of relay 6 closes this relay and shorts out the resistor 5. It is apparent that once the starting torque of the large rotatable member X has been overcome it is more efficient to eliminate the adjustable resistor 5.

The apparatus now continues to operate as long as desired. To stop the machine either switch 11 or 11' is pressed. However these switches are operable to three positions. The first position is as illustrated. The second position is achieved with the plunger of the switch depressed partially so as to break the normally closed contacts without making the circuit of the normally open contacts. The third position is brought about when the plunger is entirely pressed in to short the normally open contacts of the switch.

In its second position the stopping switch 11 or 11' acts to break the energizing circuit of the winding 9 of switch 4. This opens the armature 52 which causes switch 4 to open. This operation disconnects the power supply from the motor so that the motor decelerates and comes to a stop during a time interval depending on the inertia of its moving parts and the rotatable members to which it is connected. Similarly, as soon as the motor 3 is deenergized the rotating members X and Y no longer are driven and they slowly decelerate depending upon their rotating inertia. Since the drum X has a large diameter and is heavy, it will have a high rotating moment of inertia and take a substantial time to come to a complete stop.

In its third position, the stopping switch 11 or 11' causes the control circuit to provide another function. In this third position the energizing circuit of the motor 3 is again disconnected. In addition to this however, as long as switch 11 or 11' is maintained in the third position the energizing winding 17 of relay 14 is connected between the phase S and ground. Energization of winding 17 closes relay 14 permitting the passage of rectified current from rectifier 13 through resistor 15 to energizing winding of the magnetic brake 16. This braking force applied to the rotating member X hastens the deceleration of this member thereby causing it to come to a complete stop during a much shorter time interval. The lamp 18 is illuminated whenever the braking force is applied.

Therefore with the circuit as described above an operator can start the motor under load avoiding intermittent action of the motor and assuring a smooth start by the use of the series resistor in the phase U. When desired the operator can deenergize the motor and allow both the motor and the rotating members of the machine to slowly come to a stop. Also if desired the operator can deenergize the motor and simultaneously provide a braking force for the heavier rotatable member X to cause it to stop quickly. It is apparent that in the operation of the machine as described herein these features are exceedingly important. In the event that anything goes wrong with the material being fed through the machine the operator can stop the rotating members in short order.

In the event that the rollers of the rolling machine become jammed for any reason and are unable to rotate, if the machine is unattended, the motor will tend to draw more and more current as it attempts to overcome the load resisting rotation. It is obvious that this would burn out the motor windings and for this purpose the motor protective switch 4 contains conventional circuit breaking elements which are activated by the current increase. These circuit breaking elements serve to open the protective switch 4 in the manner known in the art, thereby stopping rotation of motor 3. The circuit breaker could be reset and the motor started by operation of the member 19 of switch 4.

Another feature of the control circuit embodying the principles of the present invention resides in the use of the limit switch 10. As hereinabove described, the switch 10 is connected to a clutch member 54. If the roughening machine is being used on material which suddenly rips the roller Y would have no load on it and being of small diameter it would tend to rotate very fast. In this event the clutch member acts to disengage the rotating member Y from the motor 3. The movement of the clutch member 54 actuates the limit switch 10 which acts in the manner of switch 11 in its third operating position to disconnect the motor 3 from the three-phase power supply and to simultaneously energize the winding 17 of the relay 14. Therefore the driving force of the roller Y is disconnected and the larger diameter roller X is braked to a quick complete stop. In this manner, the limit switch 10 can be operated by the clutch member 54 whenever the roller Y presents an undesirable load condition for the force driving the roller.

It is apparent that if desired a similar clutch member can be used on the roller Y to disengage when the roller Y is prevented from rotating and thereby actuate the limit switch 10. This would serve as an added protection and could be arranged to operate before the operation of the motor protective switch 4.

The adjustable resistors 5 and 15 shown in Fig. 2 can be preset by the operator depending on the rotatable members with which the control circuit is being used.

It will be understood that each of the elements described above, or two or more together, may also find a useful application in other types of control circuits for rotatable members differing from the types described above.

While the invention has been illustrated and described as embodied in a control circuit for a material roughening machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for controlling the rotation of a rotatable member, comprising in combination, a three-phase alternating current motor rotatably connected to said rotatable member; a three-phase alternating current power supply for energizing said motor; a three-pole motor protective switch connected between said motor and said power supply, said protective switch having an energizing winding; an adjustable series resistor connected in one phase of said alternating current motor; a starting switch having a first and a second operating position whereby operation of said starting switch from its first to its second position energizes said winding of said protective switch thereby connecting said power supply to said motor to smoothly start rotation of said motor with said resistor in series with one phase thereof; and means for short circuiting said series resistor after said motor has started to rotate, said short circuiting means being activated upon the return of said starting switch to its first operating position.

2. Apparatus of claim 1 wherein said means for short circuiting said series resistor is a relay having an energizing winding connected to one phase of said power supply by the operation of said motor protective switch and the return of said starting switch to its first operating position in sequence.

References Cited in the file of this patent

UNITED STATES PATENTS

| 909,872 | Cummiskey | Jan. 19, 1909 |
|---|---|---|
| 973,926 | Dunlop | Oct. 25, 1910 |
| 1,041,642 | Lindquist | Oct. 15, 1912 |
| 1,454,853 | Kintzing | May 15, 1923 |

FOREIGN PATENTS

| 316,326 | Great Britain | June 19, 1930 |